Nov. 8, 1949  F. S. STERNAD ET AL  2,487,196
LOADING APPARATUS FOR TIRE-BUILDING MACHINES
Filed Aug. 7, 1947  3 Sheets-Sheet 1
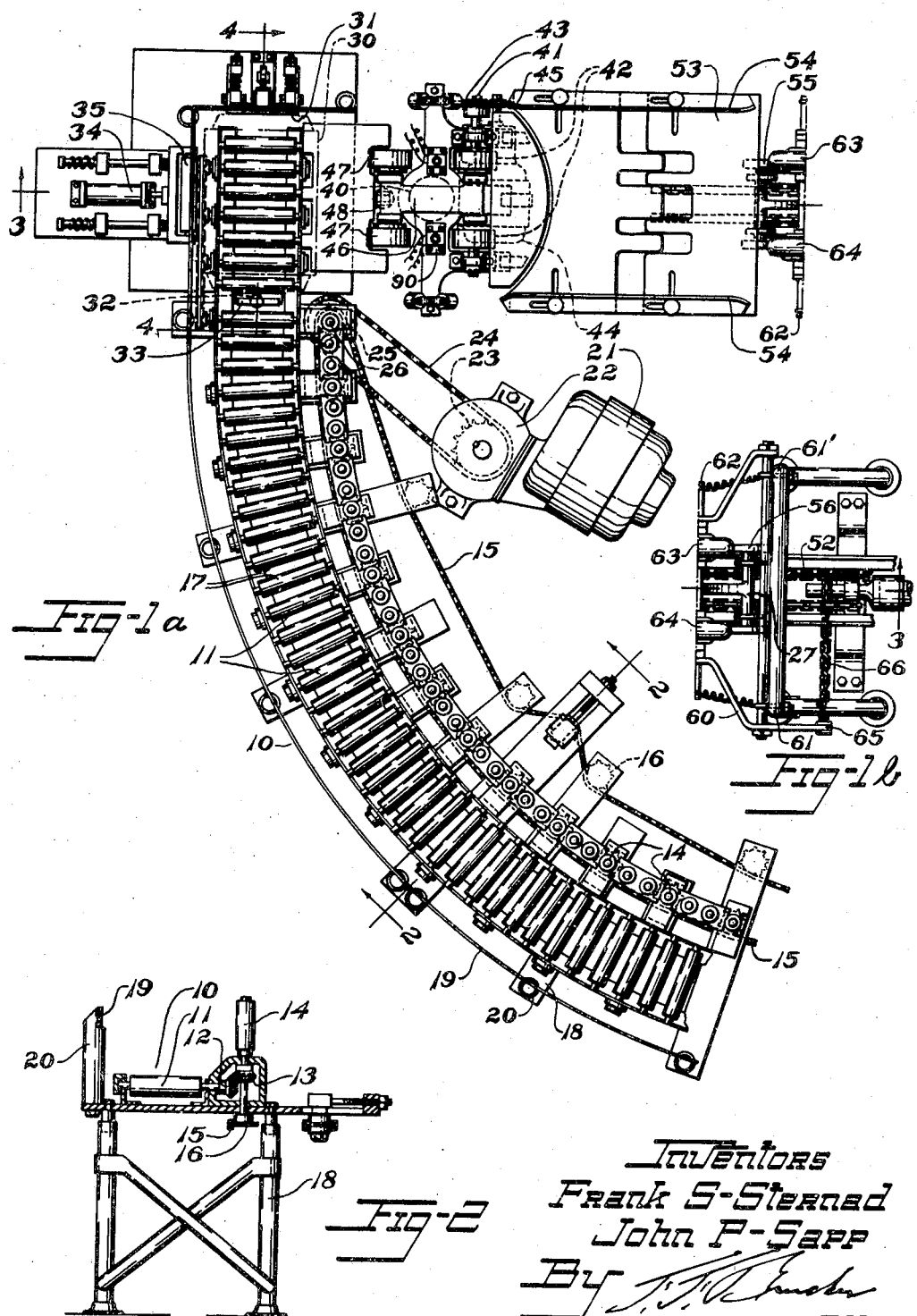

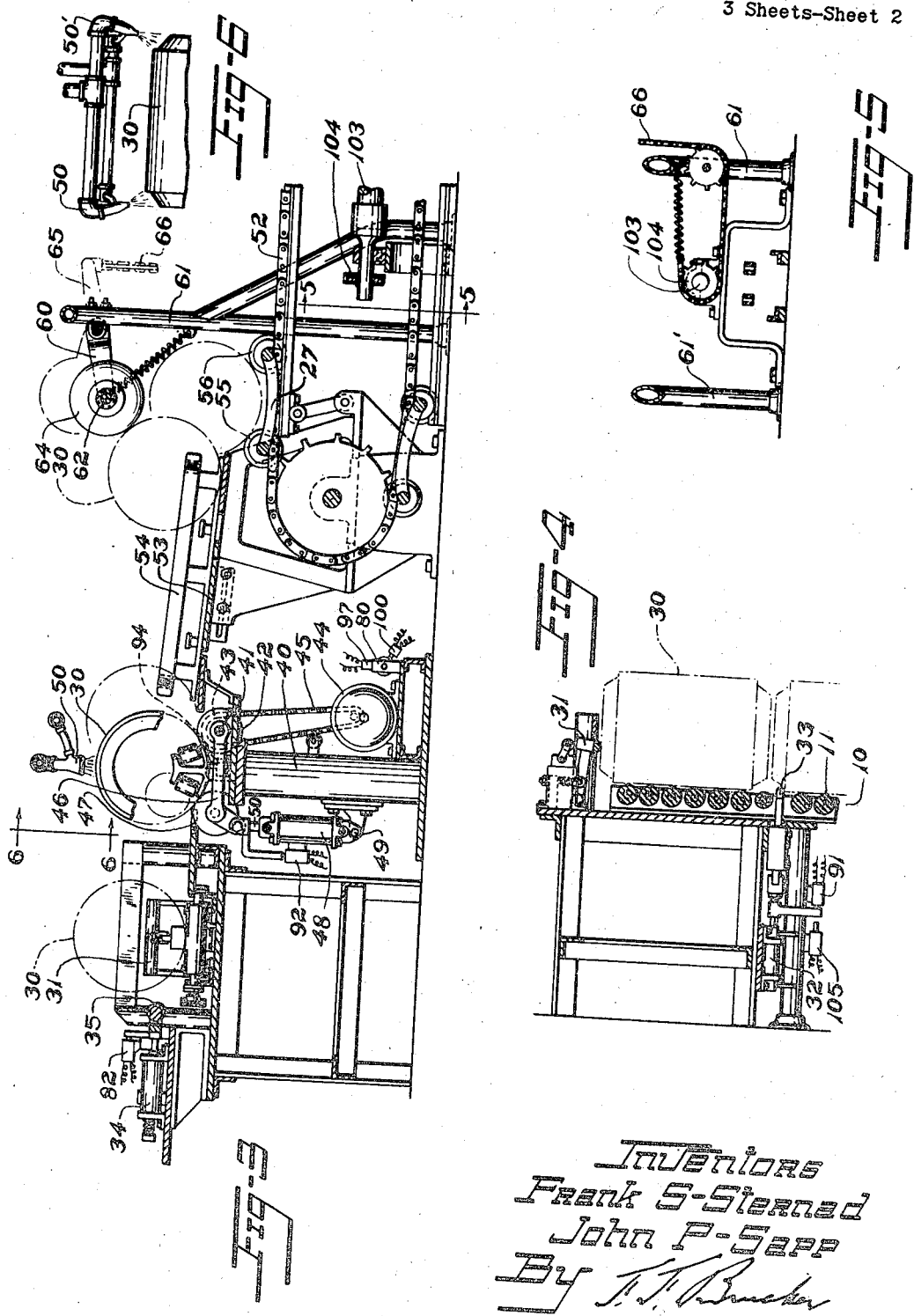

Patented Nov. 8, 1949

2,487,196

UNITED STATES PATENT OFFICE 2,487,196

LOADING APPARATUS FOR TIRE-BUILDING MACHINES

Frank S. Sternad, Cuyahoga Falls, and John P. Sapp, Kent, Ohio, assignors to The B. F. Goodrich Company, New York, N. Y., a corporation of New York Application August 7, 1947, Serial No. 767,062

8 Claims. (Cl. 154—9)

This invention relates to loading apparatus for tire-building machines and includes provision for applying an adhesive coating to tire building drums.

The invention is useful especially in preparing tire building drums by providing an adhesive or other coating to the margins thereof before the drums are delivered to the fabric applying units of a tire building machine, and is shown as employed in connection with the machine of our U. S. Patent No. 2,319,643 in which a plurality of drums are conveyed intermittently past a plurality of stations at which work is performed thereon, the drums being carried between stations by a chain conveyor having carriages for supporting the drums.

An object of the invention is to provide for facilitating the loading of the drums on the carriages of the machine.

A further object of the invention is to provide for rotating and spraying the drums automatically as they arrive from a conveyor and for transporting them and delivering them to the conveyor of the tire-building machine.

Other objects are to provide for delivery of the cemented drums to the tire-building machine at the desired intervals and in the desired angular disposition or attitude, and to provide uniformity of application of the adhesive coatings.

These and other objects will appear from the following description and the accompanying drawings.

Of the drawings,

Figs. 1a and 1b which are continuations of each other, are a plan view of apparatus corresponding to and embodying the invention, parts being broken away.

Fig. 2 is a cross-section thereof, taken on line 2—2 of Fig. 1a.

Fig. 3 is a cross-sectional view, taken on line 3—3 of Figs. 1a and 1b.

Fig. 4 is a cross-sectional view, taken on line 4—4 of Fig. 1a.

Fig. 5 is a cross-sectional view, taken on line 5—5 of Fig. 3.

Fig. 6 is a detail elevation taken on the plane 6—6 of Fig. 3, parts being broken away.

Figure 7:
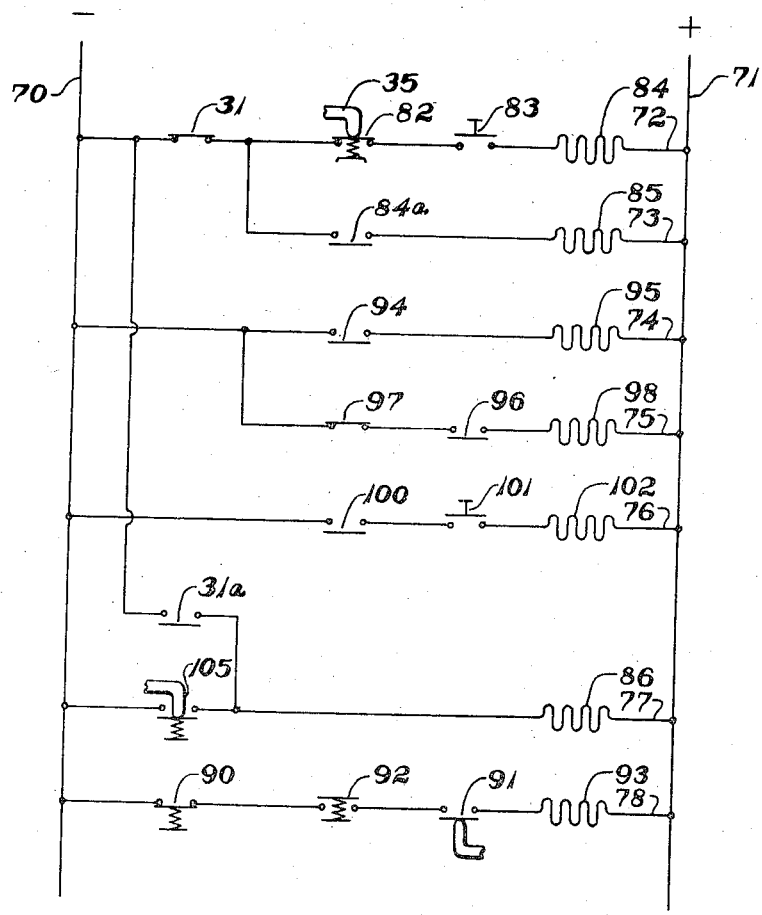
Fig. 7 is a schematic wiring diagram.

Referring to the drawings, the numeral 10 designates a conveyor which receives the drums from the delivery end of the tire building machine after the tires have been removed from the drums and delivers the drums along a curved path to the cementing apparatus. The conveyor has a series of live rolls 11, arranged with their axes in a horizontal plane. Each live roll is driven through miter gears 12, 13 from vertical guide rolls 14 which in turn are driven by a sprocket chain 15 engaging a sprocket 16 on the vertical roll shaft. Between the live rolls are additional idle rolls 17. The entire conveyor is supported by a frame 18 to which a guide rail 19 is secured by posts 20. The arrangement is such that the drums are conveyed in a direction substantially parallel to their axes, endwise, upon the rolls 11 and 17 and between rolls 14 and guide rail 19. The conveyor is driven by a motor 21 through a speed reducer 22, a sprocket 23 on the speed reducer driving a chain 24 which drives a sprocket 25 on a shaft 26 meshing with sprocket engaging chain 15.

As one of the drums 30 approaches the end of the conveyor 10 it contacts a limit switch 31 (see Fig. 4). This switch operates to stop the motor 21 and therefore the conveyor. It also simultaneously energizes a solenoid switch admitting fluid under pressure to the lower end of a cylinder 32 causing a stop 33 to be raised in advance of the next drum in the procession thereby avoiding the frictional engagement of the following drum with drum 30. Also, with advance of the stop 33, fluid under pressure is admitted to the left end of a cylinder 34, as seen in Fig. 3 to advance a plunger 35 to move the drum 30 laterally of the conveyor to the cementing mechanism.

Means is provided for rotating the drum about its axis during the application of cement thereto. For this purpose a frame 40 is provided having a horizontal shaft 41 journaled therein. Cradle rolls 42, 42 and a sprocket 43 are secured to the shaft. A motor 44 drives sprocket 43 through a chain 45. Fulcrumed upon shaft 41 is a yoke 46 having bearings for cradle rolls 47, 47. A vertical cylinder 48 is pivotally supported at 49 from frame 40 and its piston rod 50 is pivotally connected to the yoke 46. The arrangement is such that when plunger 35 advances a drum, the drum takes a position where it rests upon the cradle rolls 42, 47 and is rotated thereby about its axis, and when cradle rolls 47, 47 are raised, the drum is rejected by the cradle rolls.

Cementing of the drum 30 takes place while it is being rotated by the cradle rolls 42, 47 the cement being delivered onto the drum by spray nozzles 50, 50'.

Between the cradle rolls 42, 47 and the receiving end of the conveyor 52 is an inclined runway 53 having side rails 54. The conveyor 52 has a series of drum-supporting carriages 27 spaced therealong and having cradle rolls 55, 56 on each carriage for supporting a drum and delivering it to the tire building stations step by step. It is essential that the drums from the runway 53 be delivered only as a carriage 27 arrives at the end of the runway as in Fig. 3.

For retaining the drums on the runway 53 until time for deposit of a drum upon a carriage 27, a swing frame 60 is pivotally mounted upon pedestals 61, 61'. At one end of the swing frame is a horizontal shaft 62 on which are rotatably mounted a pair of rubber-tired wheels 63, 64. These wheels in their lowered position, shown in full lines in Fig. 3, obstruct drums 30 from leaving the runway 53 and in their raised dot-and-dash line position of Fig. 3 permit a drum to roll onto a conveyor carriage. As a carriage 27 arrives in receiving position, as shown in Fig. 3, swing frame 60 is raised and a drum is deposited upon a cradle 27. The swing frame 60 is controlled in its movements by an arm 65 thereon operated by a chain 66 which is connected to an operating solenoid 102. The solenoid 102 is energized by a limit switch 100 on the first tire building unit of the tire building machine and is closed whenever the conveyor stops and the chucking members advance to chuck a drum at that unit.

The mechanism is preferably controlled electrically and for this purpose, referring to Fig. 7, power lines 70, 71 are provided between which are connected a motor starting circuit 72 for the motor 21 and a motor running circuit 73 therefor, a motor starting circuit 74 for the cement sprayer and timer and a motor running circuit 75 therefor, a drum dumping circuit 76 for operating cylinder 48, an operating circuit 77 for controlling operation of the pressure fluid operated cylinder 32, and a circuit 78 for controlling operation of the pressure fluid operated cylinder 34.

Referring to circuits 72, 73 of Fig. 7, circuit 72 includes the normally closed limit switch 31, limit switch 82, normally held closed by plunger 35 being in its retracted position, a foot-operated normally-open, but latched in closed position, switch 83 and a solenoid 84, while circuit 73 includes a normally open solenoid operated switch 84a and a motor starting solenoid 85 as well as normally closed limit switch 31, previously mentioned. The arrangement is such that upon closing foot switch 83, provided switch 31 is closed by absence of a drum thereat and switch 82 is closed by retracted plunger 35, solenoid 84 is energized closing switch 84a and starting motor 21 and conveyor 10. As a drum 30 reaches the end of conveyor 10 it opens normally closed limit switch 31 stopping the motor 21 and conveyor 10. At the same time that switch 31 opens, a normally open switch 31a mechanically connected thereto, in circuit 77, closes energizing a solenoid 86 in that circuit, which admits fluid under pressure to the lower end of cylinder 32, raising stop 33 in the path of the following drums.

Cylinder 34 has its piston in a retracted position as long as a drum is resting on the cradle rolls 42, 47, as a drum in that position holds a normally closed limit switch 90 in circuit 78 open. Also a normally open limit switch 91 in the same circuit is closed by the stop 33 only when the stop is in its raised position and a second normally open limit switch 92 in that circuit is held closed by the plunger of the cylinder 48 only when the cradle rolls 42, 47 are in their lowered position.

A solenoid 93 in circuit 78, when energized, operates a solenoid valve to advance the plunger of the cylinder 34 and thereby advance a drum 30 onto the cradle rolls 42, 47. The arrangement is such, however, that such advance does not occur unless the stop 33 is raised, and the cradle rolls 42, 47 are empty and lowered. When the cradle rolls are lowered and empty, the stop 33 being raised, plunger 35 is advanced by energizing of solenoid 93.

As a drum 30 is advanced onto the rolls 42, 47, limit switch 90 is opened and plunger 35 returns opening switch 105, limit switch 31 is closed by absence of a drum at the end of the conveyor, limit switch 31a is thereby opened lowering stop 33, and motor 21 is again started to advance another drum provided that circuit 72 is closed. This requires that limit switch 82 be closed and consequently that stop 33 be in its fully lowered position.

As a drum 30 is deposited on rolls 42, 47 it contacts a normally open limit switch 94 in circuit 74. This energizes solenoid 95 which closes a normally open switch 96 in circuit 75. Circuit 75 includes a normally closed limit switch 97, switch 96 and solenoid 98. Solenoid 98, when energized, starts a timer 80 which in turn controls motor 44 and sprays 50. The timer is arranged to open switch 97 after a desired period of time has expired. The arrangement is such that upon closing of circuit 77 the rolls 42, 47 revolve the drum through several revolutions while the sprays 50, 50' spray a cement coating upon shoulders of the drum, and after the desired coating interval the spray valves are closed and the motor 44 stopped.

Dumping of the drums onto the runway 53 is controlled by circuit 76, which includes a normally open limit switch 100 adapted to be closed by the timer at the end of its cycle and a foot-operated latch-in switch 101, in addition to a solenoid 102 which operates a valve to admit fluid to the lower end of cylinder 48.

The cemented drum rolls down the runway 53 until it contacts the wheels 63, 64 which retain it upon the runway until a carriage 27 is in position for loading. A carriage 27 reaches the loading position at the same time that preceding carriages are stopped at the tire-building machine stations and the drums thereon lifted and chucked by the chucking cones. As these cones are advanced, a sprocket 104 to which chain 66 is secured and which sprocket is fixed to rockshaft 103 which controls movement of the cones, is rotated winding up chain 66 and thereby lifting wheels 63, 64 and permitting a drum 30 to roll onto the carriage. As the cones are withdrawn preceding the next advance of the conveyor chain, the wheels 63, 64 are lowered to their normal position.

The apparatus has the advantage of uniformly cementing the drums and feeding them one at a time to the conveyor 52 as required.

Variations may be made without departing from the scope of the invention as it is defined by the following claims.

We claim:
1. Loading apparatus for supplying cemented drums to a tire-building machine, said apparatus comprising a driven cradle for rotating a tire building drum, means at said cradle for applying a coating to a drum as it is rotated thereby, and means for feeding drums in succession from said cradle to a tire building machine.

2. Loading apparatus for supplying cemented drums to a tire-building machine, said apparatus comprising a driven cradle for rotating a tire-building drum, means at said cradle for applying a coating to a drum as it is rotated thereby, an inclined runway, means for advancing drums from said cradle to said runway, and means for feeding drums in succession from said runway to a tire-building machine.

3. Loading apparatus for supplying cemented drums to a tire-building machine, said apparatus comprising a driven cradle for rotating a tire building drum, means at said cradle for applying a coating to a drum as it is rotated thereby, an inclined runway, means for advancing drums from said cradle to said runway, including means for tipping said cradle to cause a drum to roll therefrom onto said runway, and means for feeding drums in succession from said runway to a tire-building machine.

4. Loading apparatus for supplying cemented drums to a tire-building machine, said apparatus comprising a cradle having driven rolls for rotating and supporting a tire-building drum, means for feeding drums in succession onto said cradle, means at said cradle for applying a coating to said drum, timer means actuated by arrival of a drum on said cradle rolls for initiating operation of said coating applying means, a runway, and means operated by said timer for discharging the drum from said rolls onto said runway.

5. Apparatus for supplying cemented drums to a tire building machine having a conveyor arranged to support tire-building drums thereon at intervals therealong, said apparatus comprising a drum coating unit comprising means for rotating a drum about its axis, means for applying a coating thereto as the drum is rotated, means for supplying a procession of drums to said unit, means for feeding drums one at a time from said procession to said drum rotating means, and means for discharging the coated drums one at a time onto said conveyor in timed relation to movements of said conveyor.

6. Apparatus for supplying cemented drums to a tire building machine having a conveyor for advancing tire building drums step by step from station to station and having carriages thereon at spaced apart intervals for supporting said drums, said apparatus comprising a drum coating unit comprising a cradle adjacent said conveyor for rotating a drum about its axis, and means for applying a coating to the drum as it is rotated, means for feeding a procession of drums to said unit, means for discharging the coated drums from said unit, and means for depositing the coated drums onto said conveyor in timed relation with arrival of the conveyor carriages at said unit.

7. Apparatus for supplying cemented drums to a tire building machine having a conveyor for advancing tire building drums step by step from station to station and having carriages thereon at spaced apart intervals for supporting said drums, said apparatus comprising a drum cementing unit comprising a cradle adjacent said conveyor for rotating a drum about its axis and means for applying cement to the drum as it is rotated, means for feeding a procession of drums to a position adjacent said cementing unit, means for advancing drums one at a time from said procession to said cementing unit, means for discharging cemented drums from said cementing unit, and means for depositing the cemented drums onto said conveyor in timed relation with arrival of conveyor carriages at said cementing unit.

8. Apparatus for supplying cemented drums to a tire building machine having a conveyor for advancing tire building drums step by step from station to station, and having carriages thereon at spaced apart intervals for supporting said drums, said apparatus comprising a drum cementing unit comprising a cradle adjacent said conveyor for rotating a drum about its axis and means for applying cement to the drum as it is rotated, means for feeding a procession of drums to a position adjacent said cementing unit, means for advancing drums one at a time from said procession to said cementing unit, said advancing means being controlled by absence of a drum at said cementing unit, means for discharging cemented drums from said cementing unit upon completion of cementing thereof, and means for depositing the cemented drums onto said conveyor carriages in timed relation with arrival of said carriages at the delivery end of said cementing unit.

FRANK S. STERNAD.
JOHN P. SAPP.

REFERENCES CITED

The following references are of record in the file of this patent:

UNITED STATES PATENTS

| Number | Name | Date |
|---|---|---|
| 745,300 | Smith | Nov. 24, 1903 |
| 1,395,183 | Harsel et al. | Oct. 25, 1921 |
| 1,964,363 | Ostling et al. | June 26, 1934 |
| 2,132,324 | Schrank | Oct. 4, 1938 |
| 2,319,643 | Sternad et al. | May 18, 1943 |
| 2,394,464 | McChesney | Feb. 5, 1946 |